United States Patent
Liu et al.

(10) Patent No.: US 11,029,996 B2
(45) Date of Patent: Jun. 8, 2021

(54) MULTICORE OR MULTIPROCESSOR COMPUTER SYSTEM FOR THE EXECUTION OF HARMONIC TASKS

(71) Applicant: SAFRAN ELECTRONICS & DEFENSE, Boulogne Billancourt (FR)

(72) Inventors: Céline Liu, Boulogne Billancourt (FR); Christian Valpard, Boulogne Billancourt (FR)

(73) Assignee: Safran Electronics & Defense, Boulogne Billancourt (FR)

( * ) Notice: Subject to any disclaimer, the term of this patent is extended or adjusted under 35 U.S.C. 154(b) by 0 days.

(21) Appl. No.: 16/325,332

(22) PCT Filed: Aug. 1, 2017

(86) PCT No.: PCT/EP2017/069483
§ 371 (c)(1),
(2) Date: Feb. 13, 2019

(87) PCT Pub. No.: WO2018/033387
PCT Pub. Date: Feb. 22, 2018

(65) Prior Publication Data
US 2019/0205161 A1    Jul. 4, 2019

(30) Foreign Application Priority Data

Aug. 18, 2016    (FR) .................................... 16 57812

(51) Int. Cl.
| G06F 9/46 | (2006.01) |
|---|---|
| G06F 9/48 | (2006.01) |
| G06F 9/32 | (2018.01) |
| G06F 9/50 | (2006.01) |
| G06F 13/362 | (2006.01) |

(52) U.S. Cl.
CPC ............ *G06F 9/4837* (2013.01); *G06F 9/321* (2013.01); *G06F 9/4881* (2013.01); *G06F 9/5038* (2013.01); *G06F 13/362* (2013.01)

(58) Field of Classification Search
None
See application file for complete search history.

(56) References Cited

U.S. PATENT DOCUMENTS

| 5,758,169 | A | * | 5/1998 | Nizar | ..................... G06F 9/4818 710/260 |
|---|---|---|---|---|---|
| 5,881,284 | A |  | 3/1999 | Kubo |  |
| 7,302,685 | B2 | * | 11/2007 | Binns | ..................... G06F 9/4887 370/415 |
| 9,342,365 | B2 | * | 5/2016 | Min | ..................... G06F 9/5088 |
| 2004/0068730 | A1 |  | 4/2004 | Miller et al. |  |
| 2018/0039514 | A1 | * | 2/2018 | Liao | ..................... G06F 9/4887 |

* cited by examiner

*Primary Examiner* — Bing Zhao
(74) *Attorney, Agent, or Firm* — Muncy, Geissler, Olds and Lowe, P.C.

(57) ABSTRACT

A computer system comprising a plurality of processor units, resources for executing a harmonic set of tasks, and a task interrupt switch device having inputs for receiving a common time base and the task interrupts, outputs each connected to a respective one of the processor units, registers each corresponding a to respective one of the outputs, reinitializable counters each corresponding to a respective one of the outputs, and a control unit arranged to distribute the task interrupts between the outputs as a function of the values of the registers and of the counters.

5 Claims, 2 Drawing Sheets

| Time | Step | Core A | TL A | Core B | TL B |
|---|---|---|---|---|---|
| 0 | 0 | 1 | 4-0 | F | - |
| 1 | 0 | 2 | 4-0 | F | - |
| 2 | 0 | 2 | 4-0 | F | - |
| 3 | 0 | 2 | 4-0 | F | - |
| 4 | 1 | 2 | 4-0 | 1 | 1-1 |
| 5 | 1 | 2 | 4-0 | F | - |
| 6 | 1 | 2 | 4-0 | F | - |
| 7 | 1 | 3 | 4-0 | F | - |
| 8 | 2 | 3 | 4-0 | 1 | 2-2 |
| 9 | 2 | 3 | 4-0 | 2 | 2-2 |
| 10 | 2 | 3 | 4-0 | 2 | 2-2 |
| 11 | 2 | 3 | 4-0 | 2 | 2-2 |
| 12 | 3 | 1 | 1-3 | 2 | 2-2 |
| 13 | 3 | 3 | 4-0 | 2 | 2-2 |
| 14 | 3 | 3 | 4-0 | 2 | 2-2 |
| 15 | 3 | 4 | 4-0 | F | |
| 16 | 4 | 4 | 4-0 | 1 | 3-4 |
| 17 | 4 | 4 | 4-0 | 2 | 3-4 |
| 18 | 4 | 4 | 4-0 | 2 | 3-4 |
| 19 | 4 | 4 | 4-0 | 2 | 3-4 |
| 20 | 5 | 1 | 1-5 | 2 | 3-4 |
| 21 | 5 | 4 | 4-0 | 2 | 3-4 |
| 22 | 5 | 4 | 4-0 | 2 | 3-4 |
| 23 | 5 | 4 | 4-0 | 3 | 3-4 |
| 24 | 6 | 1 | 2-6 | 3 | 3-4 |
| 25 | 6 | 2 | 2-6 | 3 | 3-4 |
| 26 | 6 | 2 | 2-6 | 3 | 3-4 |
| 27 | 6 | 2 | 2-6 | 3 | 3-4 |
| 28 | 7 | 2 | 2-6 | 1 | 1-7 |
| 29 | 7 | 2 | 2-6 | 3 | 3-4 |
| 30 | 7 | 4 | 4-0 | 3 | 3-4 |
| 31 | 7 | F | - | F | - |

Fig. 2

MULTICORE OR MULTIPROCESSOR COMPUTER SYSTEM FOR THE EXECUTION OF HARMONIC TASKS

The present invention relates to managing tasks in multicore or multiprocessor computer systems.

BACKGROUND OF THE INVENTION

Computer systems are known that have a plurality of processor units (cores or processors) connected to resources (in particular memories) in order to execute tasks. The performance of such systems depends on the tasks being well distributed among the various processor units. Unfortunately, that is a non-polynomial problem: there is no general optimum solution.

To provide the best possible distribution, it is known to make use of real time operating systems. The management of tasks nevertheless remains relatively complex and expensive in terms of time.

OBJECT OF THE INVENTION

An object of the invention is to provide simple means for executing a harmonic set of tasks in a computer system.

SUMMARY OF THE INVENTION

To this end, there is provided a computer system comprising a plurality of processor units that are synchronous and that access resources in non-concurrent manner in order to execute a harmonic set of tasks numbered and are ordered by increasing periods in such a manner that the shorter the period of a task, the higher its priority. According to the invention, the system comprises a task interrupt switch device having an input for receiving a common time base, outputs each connected to a respective one of the processor units, registers each corresponding to a respective output, reinitializable counters each corresponding to a respective output, and a control unit arrange& to reissue each task interrupt to the output for which the register has the greatest value, and in the event of equality, to the output for which the counter has the smallest value; to store in each register the number of the task currently executing on the processor unit connected to the corresponding output; and each time a task interrupt is reissued on one of the outputs, to increment the corresponding counter by 1.

During execution, all of the tasks that are to be executed by a certain time and that are to be executed on the same processor unit are grouped together in a sequence of tasks ordered from the highest priority to the lowest priority. A stack of task sequences is thus organized distributed among the processor units. The tasks are numbered in such a manner that their periods are ordered in an increasing order. The set of these tasks is harmonic if, regardless of the task i, the period of the task i divides into the period of the task i+1. In addition, the shorter the periods of the tasks, the greater their priorities. The switch device ensures that the task sequences are distributed by selecting the processor unit that is executing the task having the lowest priority, or in the event of equal priority, the processor unit that is the least used. The operation of the switch member is thus simple and fast.

Other characteristics and advantages of the invention appear on reading the following description of a particular, non-limiting embodiment of the invention.

BRIEF DESCRIPTION OF THE DRAWINGS

Reference is made to the accompanying drawings, in which:

FIG. 2 is a table showing the operation of this computer system with such a configuration having two processor units.

DETAILED DESCRIPTION OF THE INVENTION

Figure 1:
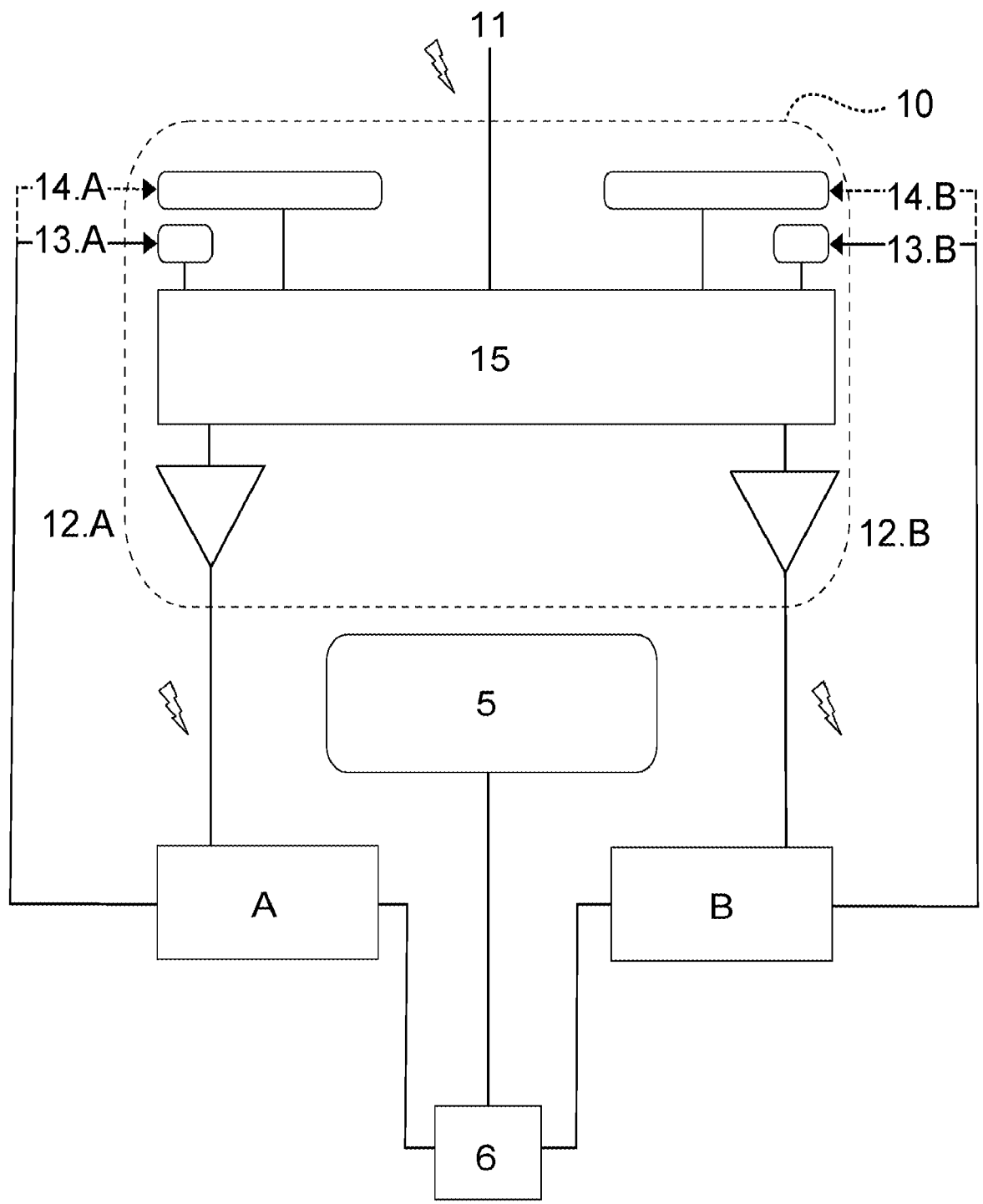
FIG. 1 is a diagrammatic view of a computer system of the invention in a configuration with two processor units.

With reference to FIG. 1, the computer system of the invention comprises two processor units A, B, connected to resources given general reference 5. The processor units A and B in this example are two cores of a single processor, however they could be two distinct processors. The processor units A and B are synchronous and they access the resources 5 in non-concurrent manner. The resources 5 comprise in particular random access memory (RAM), read only memory (ROM), an input/output device, etc. The computer system also has a central clock shared by the processor units A and B, and a power supply unit 6 powering the components of the computer system.

The computer system has a switch device 10 for switching task interrupts, and having:
- an input 11 for receiving a respective common time base;
- an output 12.A connected to the processor unit A;
- an output 12.B connected to the processor unit B;
- a 16-bit register 13.A corresponding to the output 12.A;
- a 16-bit register 13.B corresponding to the output 12.B;
- a 64-bit counter 14.A corresponding to the output 12.A and reinitializable by the unit A;
- a 64-bit counter 14.B corresponding to the output 12.B and reinitializable by the unit B; and
- a control unit 15.

The common time base is communicated solely to the control unit 15 of the switch device 10.

The control unit 15 has a circuit comprising a processor and a memory enabling it to execute a computer program. The control unit 15 is connected to the input 11, to the outputs 12.A, 12.B, and it accesses the registers 13.A, 13.B and the counters 14.A, 14.B.

The computer system makes use of a management system (or operating system) that organizes master/slave operation of the processor units A and B on a principle that is itself well known.

The computer system is arranged to execute a harmonic set of tasks without offset, the tasks being numbered and ordered in such a manner that the shorter the period of a task, the greater its priority. In this example there are four tasks i and a background task F: the number i in this example takes the values 1, 2, 3, and 4, and it is less than the number F. By way of example:
- the task 1 has a period of 4 milliseconds (ms);
- the task 2 has a period of 8 ms;
- the task 3 has a period of 16 ms; and
- the task 4 has a period of 32 ms.

The control unit 15 is programmed:
- to reissue each task interrupt to the output 12.A, 12.B having the register 13.A, 13.B with the greater value, and if their values are equal, to that one of the outputs 12.A, 12.B for which the counter has the smaller value;
- to store in each register 13.A, 13.B, the number i of the task currently being executed on the processor unit A, B connected to the corresponding output 12.A, 12.B (this information being supplied by the corresponding unit); and each time a task interrupt is reissued on one of the outputs 12.A, 12.B, to increment the corresponding counter 14.A, 14.B by 1. This program is relatively short since a few lines suffice for coding these functions.

The operation of the computer system, and more particularly of the switch device 10 is described below with reference to FIG. 2. Task activation is conventional and is not described in detail herein.

The control unit 15 receives a task interrupt at the start of each time step (each time step lasts 4 ms).

At the beginning of time step 0 (time 0), the processor unit B is executing the background task F and the control unit 15 transmits the task interrupt (symbolized by a lightning flash in the figures) on the output 12.A so that the processor unit A executes the task 1.

Each time a task interrupt is reissued on one of the outputs 12.A, 12.B, the control unit 15 increments the corresponding counter 14.A, 14.B by 1. In this example, it is the counter 14.A that is incremented.

On each execution of a new task by a processor unit A, B, the processor unit in question transmits the number of the task to the control unit 15, which stores it in the corresponding register 13.A, 13.B.

At the beginning of time step 1 (time 4), the value (2) of the register 13.A is less than the value (F) of the register 13.B. The control unit 15 reissues the task interrupt on the output 12.B so that the processor unit B interrupts execution of the task F in order to execute the task 1.

At the end of the task 1, the processor unit B returns to executing the task F.

During the time step 1, the processor unit A terminates the task 2 and begins executing the task 3.

At the beginning of time step 2 (time 8), the value (3) of the register 13.A is less than the value (F) of the register 13.B. The control unit 15 reissues the task interrupt on the output 12.B so that the processor unit B interrupts execution of the task F in order to execute the task 1.

At the end of the task 1, the processor unit B begins executing the task 2.

At the beginning of time step 3 (time 12), the value (3) of the register 13.A is greater than the value (2) of the register 13.B. The control unit 15 reissues the task interrupt on the output 12.A so that the processor unit A interrupts execution of the task 3 in order to execute the task 1.

During time step 3, the processor unit A begins executing the task 4 once the task 3 has terminated and the processor unit B begins executing the task F once the task 2 has terminated.

At the beginning of time step 4 (time 16), the value (4) of the register 13.A is less than the value (F) of the register 13.B. The control unit 15 reissues the task interrupt on the output 12.B so that the processor unit B interrupts execution of the task F in order to execute the task 1.

At the end of the task 1, the processor unit B begins executing the task 2.

At the beginning of time step 5 (time 20), the value (4) of the register 13.A is greater than the value (2) of the register 13.B. The control unit 15 reissues the task interrupt on the output 12.A so that the processor unit A interrupts execution of the task 4 in order to execute the task 1.

At the end of the task 1, the processor unit B returns to executing the task 4 and the processor unit B begins execution of the task 3 at the end of the task 2.

At the beginning of time step 6 (time 24), the value (4) of the register 13.A is greater than the value (3) of the register 13.B. The control unit 15 reissues the task interrupt on the output 12.A so that the processor unit A interrupts execution of the task 4 in order to execute the task 1.

During time step 6, the processor unit A begins execution of the task 2 once the task 1 has terminated.

At the beginning of time 7 (time 28), the value (2) of the register 13.A is less than the value (3) of the register 13.B. The control unit 15 reissues the task interrupt on the output 12.B so that the processor unit B interrupts execution of the task 3 in order to execute the task 1.

At the end of task 1, the processor unit B returns to executing the task 3.

At the end of task 2, the processor unit A returns to executing the task 2 and then begins executing the task F.

At the end of task 3, the processor unit B begins executing the task F.

It can be seen that on each interrupt, a new list of tasks TL A, TL B is allocated to each core A, B. In the example described, there are four task lists numbered 1 to 4:
  list 1 provides for executing task 1;
  list 2 provides for executing tasks 1 and 2 in sequence;
  list 3 provides for executing tasks 1, 2, and 3 in sequence; and
  list 4 provides for executing tasks 1, 2, 3, and 4 in sequence.

In FIG. 2, it can be seen that for the core A:
  the list of tasks 4 is launched at time 0 (notation 4-0);
  the list of tasks 1 is launched at time 3 (notation 1-3);
  the list of tasks 1 is launched at time 5 (notation 1-5); and
  the list of tasks 2 is launched at time 6 (notation 2-6).

For the core B:
  the list of tasks 1 is launched at time 1 (notation 1-1);
  the list of tasks 2 is launched at time 2 (notation 2-2);
  the list of tasks 3 is launched at time 4 (notation 3-4); and
  the list of tasks 1 is launched at time 7 (notation 1-7).

It can be understood that execution of a list of tasks can be interrupted to execute a new list of tasks at the end of which there is a return to executing the interrupted list of tasks.

The operation of the computer system continues in the same manner.

Naturally, the invention is not limited to the embodiment described but covers any variant coming within the ambit of the invention as defined by the claims.

In particular, the computer system may be of structure different from that described. For example, it may have more than two processor units.

The switch device may be made in the form of a dedicated circuit or of a reconfigurable circuit of the field programmable gate array (FPGA) type.

The numbers of the tasks may be in some other form: the only important point is that the tasks are ordered as a function of their periods.

The invention claimed is:

1. A computer system comprising:
   a plurality of processor units that are synchronous and that access resources in non-concurrent manner in order to execute a harmonic set of tasks each having a period that divides into the period of the following task, the tasks being numbered in such a manner that the periods are ordered in an increasing order, the shorter the period of a task, the higher its priority and the lower its number; and
   a task interrupt switch device having:
      an input for receiving a common time base, outputs each connected to a respective one of the processor units,
registers each corresponding to a respective output,
reinitializable counters each corresponding to a respective output for counting a number of times task interrupts have been transmitted to said output, and
a control unit arranged:
- to store in each register a value corresponding to the number (i) used for ordering the task currently executed on the processor unit connected to the corresponding output;
- each time a task interrupt is received, to compare the registers between them and the counters between them in order to reissue each task interrupt, upon initiation of each time step received from the common time base, to the output for which the register has the greatest value, and in the event of equality, to the output for which the counter has the smallest value;
- each time a task interrupt is reissued on one of the outputs, to increment the corresponding counter by 1;

wherein each task interrupt corresponds to execution, by the processor unit connected to the corresponding output, of a new subset of tasks of the harmonic set of tasks and each task of said new subset of tasks is executed by said processor unit to completion according to the order associated with the new subset of tasks and at the end of which there is a return to executing the interrupted subset of tasks.

2. The computer system according to claim 1, wherein the registers have a capacity of 16 bits.

3. The computer system according to claim 1, wherein the counters are 64-bit counters.

4. The computer system according to claim 1, wherein the processor unit returns to executing the interrupted task at the end of the execution of the following task.

5. The computer system according to claim 1, wherein the tasks are to be executed in sequence so that when execution of a task ends, execution of a following task of the sequence starts.

* * * * *